US006292720B1

United States Patent
Schulz et al.

(10) Patent No.: US 6,292,720 B1
(45) Date of Patent: Sep. 18, 2001

(54) TRIMMING PROCESS FOR ADAPTING A SIMULATION SYSTEM TO AN AUTOMATICALLY CONTROLLED REFERENCE SYSTEM

(75) Inventors: Gerhard Schulz, Bad Tölz/Wackersberg; Thomas Meyer, Bruckmühl, both of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/433,313

(22) Filed: Nov. 3, 1999

(30) Foreign Application Priority Data

Nov. 3, 1998 (DE) .............................. 198 50 612

(51) Int. Cl.[7] .............................. G05D 1/00; G06G 7/70
(52) U.S. Cl. ..................... 701/3; 701/11; 701/14; 701/15; 701/16; 244/190; 244/197; 244/223
(58) Field of Search ..................... 701/3, 4, 13, 14, 701/15, 16, 11; 244/197, 223, 178, 100 R, 75 R, 76 R, 183, 190, 220, 222; 345/425, 430

(56) References Cited

U.S. PATENT DOCUMENTS

| | | | |
|---|---|---|---|
| 4,660,145 | * | 4/1987 | Hansen ................................. 701/14 |
| 5,446,666 | * | 8/1995 | Bauer ................................... 701/14 |
| 5,651,341 | | 7/1997 | Harada et al. ................... 123/339.2 |
| 5,797,564 | * | 8/1998 | Cartmell et al. .................. 244/223 |
| 5,868,359 | * | 2/1999 | Cartmell et al. .................. 244/223 |
| 6,005,581 | * | 12/1999 | Gjullin ............................... 345/430 |

FOREIGN PATENT DOCUMENTS

| | | |
|---|---|---|
| 196 45 556 | 10/1997 | (DE) . |
| 0 650 891 | 5/1995 | (EP) . |
| 0 731 398 | 9/1996 | (EP) . |
| 0 809 162 | 11/1997 | (EP) . |

* cited by examiner

Primary Examiner—Jacques H. Louis-Jacques
(74) Attorney, Agent, or Firm—Crowell & Moring LLP

(57) ABSTRACT

Trimming process for adapting a first control loop of a controllable, automatically controlled reference system, which is or represents an aircraft, to a second control loop which simulates the reference system, Flying condition values including controlled variables, which are returned in each control loop for the purpose of the control, are detected, and both control loops are acted upon by the same desired input data. In the first process loop, a conversion of the unreturned flying condition values of the airplane model takes place to the values of the corresponding flying condition values of the reference system. The second process loop is provided for the adaptation of the returned condition values of the airplane simulation system to the corresponding condition values of the reference system.

5 Claims, 3 Drawing Sheets

TRIMMING PROCESS FOR ADAPTING A SIMULATION SYSTEM TO AN AUTOMATICALLY CONTROLLED REFERENCE SYSTEM

BACKGROUND OF THE INVENTION

This application claims the priority of 198 50 612.0, filed Nov. 3, 1998, the disclosure of which is expressly incorporated by reference herein.

The present invention relates to a trimming process for adapting a simulation system to a controllable, automatically controlled reference system, particularly an airplane.

For analyzing flying tests when testing airplanes, telemetry devices are provided on board the airplanes as well as in a ground station. With these devices, data, which are detected on board the airplane by corresponding sensors, can be transmitted during a flying maneuver to a ground station which is in contact with the airplane systems or the pilot or pilots. After each flying maneuver, these data are normally subjected to an analysis and, in the process, are compared, for example, with test data previously determined in ground tests or with a flight simulation taking place during the flying maneuver in a ground station.

According to this process using known techniques, only the sensor data which were determined and processed in the airplane systems are transmitted, particularly the sensor data of the pilot input systems, of the air data and initial sensor system required for the automatic flight control and the sensor data of the actuators. However, when flight testing automatically controlled airplanes, the condition of the autopilot in the course of or after the respective flying maneuver is unknown.

A disadvantage of the known process accordingly is that conclusions drawn from the telemetrically transmitted sensor data concerning conditions of the autopilot are possible only to a limited extent. Estimates and comparative analyses must therefore be carried out with respect to the autopilot conditions existing during the flying maneuvers which, particularly in the time available during a flight test, are not precise.

SUMMARY OF THE INVENTION

An object of the invention is, therefore, to provide a trimming process for adapting the autopilot conditions generally of an automatically controlled system to those of a reference system, which can be carried out as automatically as possible and during the process on the basis of the known sensor data.

An advantage of the invention is that it provides, without further analyses, data concerning autopilot conditions so that the respective still available autopilot reserves can be determined and it can therefore be technically assessed whether the continuation of the flight testing program is technically feasible with still higher demands on the autopilot. The release for more extensive flying maneuvers may possibly be granted after relatively short time after the termination of the preceding maneuver. As a result, a clear reduction of the flying time and thus of the flying test expenses is achieved.

Furthermore, the labor expenditures for the ground personnel are clearly reduced because the presentation of the flying test and analysis results in the required format can be provided without any action by the ground personnel.

The foregoing object has been achieve by providing a trimming process with two control loops by the same desired input data, wherein a process loop is provided for the adaptation of the returned condition values of the second control loop to the corresponding condition values of the reference system, in which process loop, for a predetermined time, the desired input data fed to the autopilot are acted upon by differential input data values, which are acted upon in the direction of the deviation of the flying condition values which occurs after the conversion of the flying condition values in the first loop.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
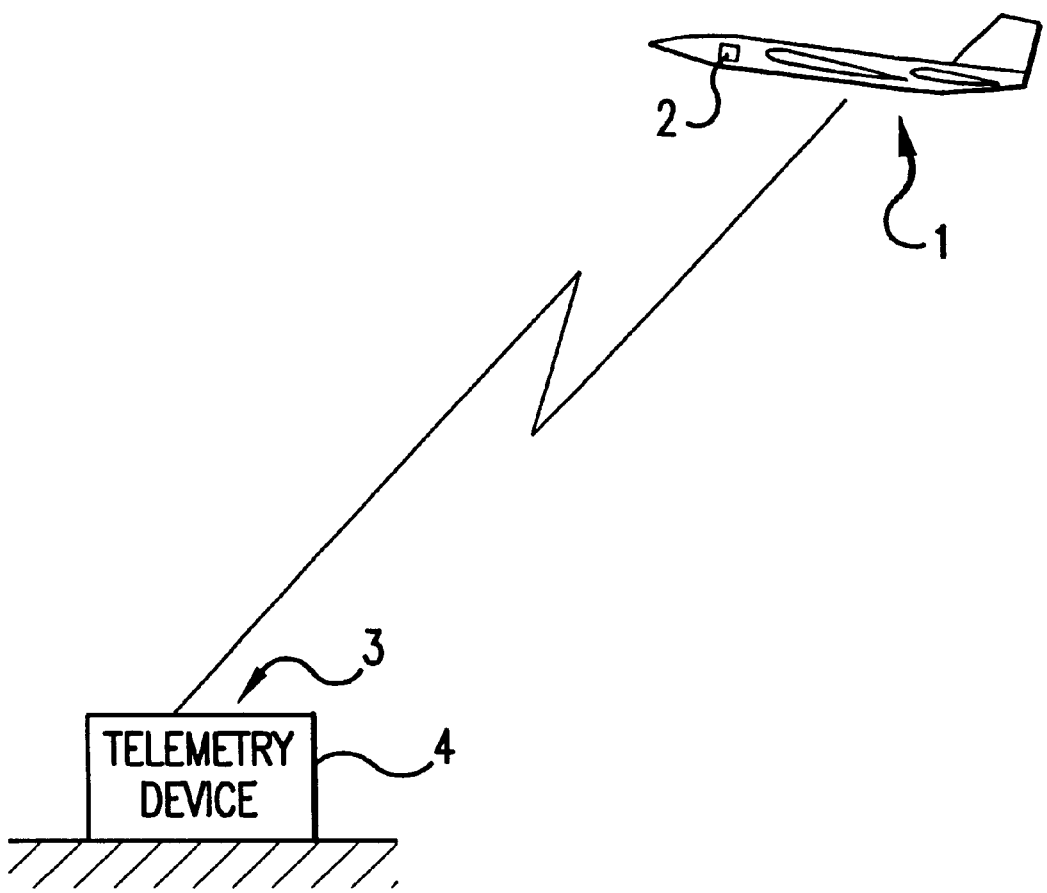
FIG. 1 is a schematic diagram of a typical situation in of a flying test in which an airplane and the ground station communicate with one another by way of telemetry devices.

FIG. 1 shows an airplane 1 or a reference system with a loop, the reference system 1, in particular, representing an airplane. It is to be understood, however, that the invention can relate to reference systems in general which are or represent automatically controlled systems. The reference system of FIG. 1 is an automatically controlled airplane 1 which has a telemetry device 2 situated on board. The telemetry device 2 transmits, among others, sensor data of the airplane 1 to a ground station 3. The ground station 3 comprises a telemetry device 4, by way of which the data of the airplane-side telemetry device 2 can be received. In the telemetry device 4 of the ground station 3, these data are analyzed and evaluated, for example, in order to grant the pilot of the airplane 1 the clearing for further flying maneuvers.

Figure 2:
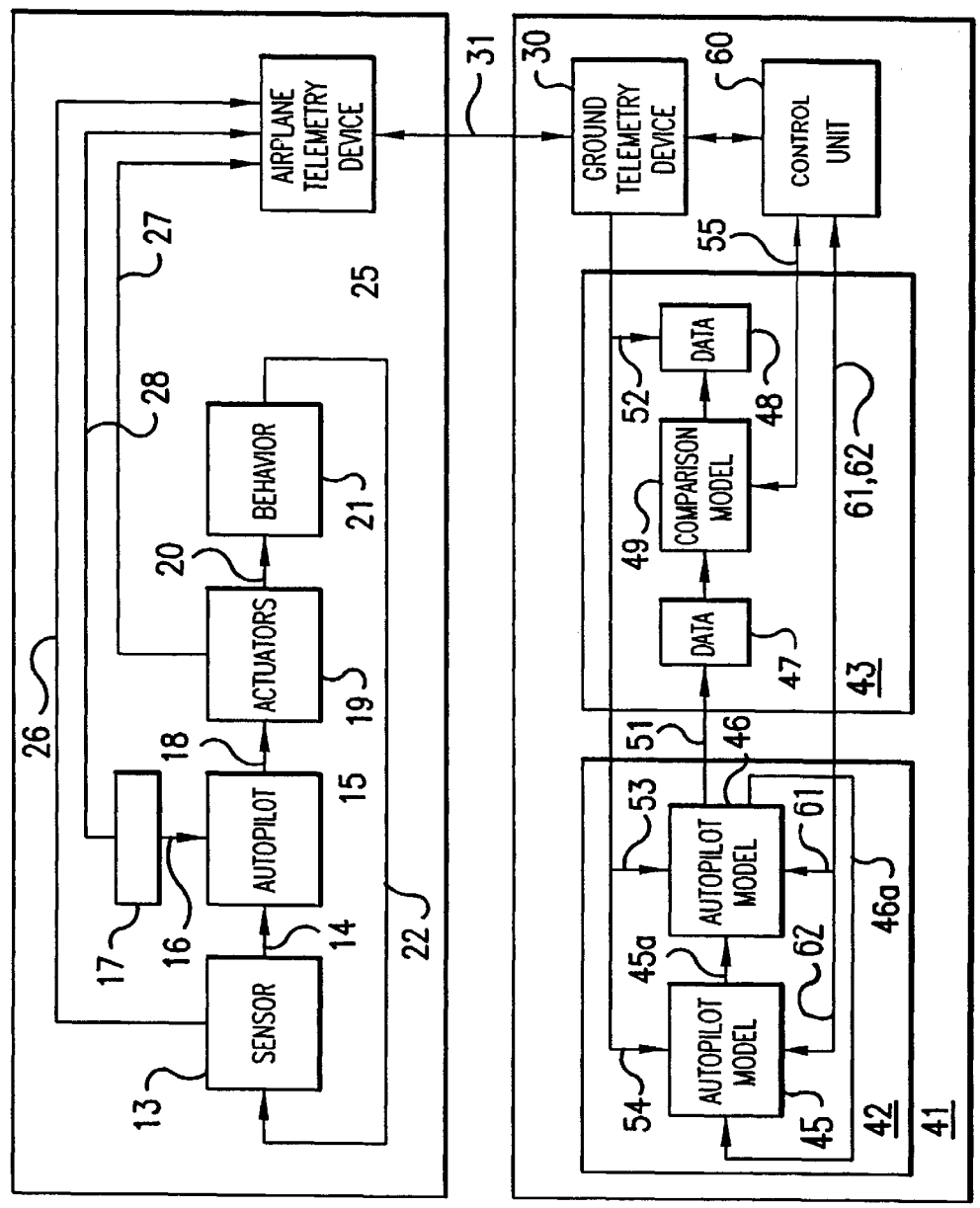
FIG. 2 is a schematic block diagram showing the functional sequences in the process and system according to the present invention.

FIG. 2 shows the reference system or the airplane 1 in the functional respect in the form of a loop by way of reference number 11. The airplane functions 11 have a sensor system 13 which comprises an air data sensor system and a inertial data sensor system. The sensor system 13 may also comprise corresponding sensor models if the reference system 1 itself is a simulation system or a model of a real system. The data 14 detected by the sensor system 13 and processed by a data processing system assigned to it are sent by way of corresponding lines to an autopilot 15.

The autopilot 15 receives, in addition to the data 14, among others, also data 16 from an input system or pilot input system 17. These comprise particularly the pilot's control stick and the pedals as well as pertaining sensors, from which the data or signals 16 are sent to the autopilot 15.

The autopilot 15 may be formed by several redundant channels. For monitoring and consolidating these channels as well as in each case data and signals 14, 16, so-called voting and monitoring functions are provided in the autopilot 15 to consolidate the same or similar input data. The internal condition of the autopilot 15 is, among other things, determined by the data which are present in the different voting and monitoring functions as the result of the respective available controlled variables, as the result of the respectively selected amplification factors, and of the parameters of limiting elements in each case in the different channels of the autopilot 15.

The output data of the autopilot 15 are, among others, actuating signals or actuating data 18 which are sent to the different actuators 19 of the control flaps. The actuators 19 can comprise a corresponding sensor system for detecting the position data of control valves or of the control surfaces. The control flap movements cause air forces acting upon the airplane. The behavior of the real airplane is designated by the reference numeral 21 in FIG. 2. The airplane behavior 21 has an effect 22 on the sensor system 13 which detects the respective inertial flying position and the fluidic flying condition.

An airplane telemetry device 25 is also provided on board the airplane and is in a data exchange with other airplane functions 11. Particularly, sensor signals or sensor data 26 from the sensor system 13 as well as sensor signals or sensor data 27 from the sensor system provided at the actuators 19 are sent to the airplane telemetry device 25. Furthermore, the airplane telemetry device 25 also receives desired input data 28 from the pilot input device 17.

The airplane telemetry device 25 is in radio contact with a ground telemetry device 30 of the ground station 4. By way of the airplane telemetry device 25 and the ground telemetry device 30, the data can be exchanged which are required for implementing and analyzing the flying test. In particular, the ground telemetry device 30 in this case receives the data 26, 27, 28. As indicated above, data from sensors may also be supplied to the telemetry device 25 to measure the condition on other airplane systems, for example, at the power unit, at the landing gear, and at the airplane structure.

The ground station 3 comprises ground station functions 41 which are illustrated in FIG. 2. These comprise, among others, an airplane simulation system 42 which has the form of a loop; and a computing module for comparison operations 43 as well as functions of the ground telemetry device 30. In the airplane simulation system 42, essentially the functions of the sensor system 13, of the autopilot 15, of the pilot input device 17, and of the actuators 19 of the real airplane are simulated and therefore also comprise an autopilot or an autopilot model 45 and an airplane model 46.

Functionally or with respect to the equipment, the autopilot 45 may be identical with or similar to the autopilot 45 existing in the airplane or may be a model thereof. In particular, the autopilot 45 of the airplane simulation system 42, in comparison to the autopilot 15 of the real airplane 1, may be manufactured in various programming languages and according to different processes and may be implemented on different computer hardware. The airplane model 46 preferably comprises sensor models and actuator models which simulate the sensor system 13 and the actuators 19. The airplane model 46 may also comprise a model or models of different plane systems, such as the power unit. By way of flight-mechanical motion equations and aerodynamic datasets, the behavior 21 of the real airplane is simulated in the airplane model 46. Corresponding data 45a are sent from the autopilot 45 to the airplane model 46, from which data 46a are returned to the autopilot model 45.

The airplane functions 11 as well as the airplane simulation 42 may be structured differently or constructed differently than illustrated in FIG. 2. It is important, however, that it is an automatically controlled airplane 1 which has an autopilot which exists on board the airplane 1 as well as in the form of a model in the ground station 3. Furthermore, a sensor system is required on board the automatically controlled airplane 1 for detecting the exterior and interior conditions of the airplane 1 and transmitting them to the ground station 3.

Furthermore, the ground station functions 41 comprise a computing module 43 for comparison operations, in which data 47 concerning the flying condition of the airplane model 46 are compared with data 48 concerning the flying condition of the flying airplane 1 in a comparison module 49. The data 47 essentially correspond to data 51 which arrive at the computing module 43 from the airplane model 46. Likewise, the data 48 concerning the flying condition of the flying airplane 1 essentially correspond to data 52 which arrive at the computing module 43 from the ground telemetry device 30. The data 52 correspond essentially, on one hand, to the data 27 which are sent from the sensor system 19 of the actuators of the real airplane 1 to the airplane-side telemetry device 25 and, on the other hand, data which arrive at the airplane-side telemetry device 25 from sensors of other airplane systems.

In addition, the ground telemetry device 30 sends data 53 to the airplane model 46. In this case, the data 53 essentially correspond to the data 14 of the sensor system 13. Data 54 from the ground telemetry device 30 arrive at the autopilot model 45 which essentially correspond to the desired input data 28 arriving at the airplane telemetry device 25 from the pilot input system 17, which arrive in the form of the data 31 by way of the radio contact with the ground telemetry device 30. From the comparison module 49, data 55 are sent to a control unit 60. Data 61 are exchanged between the control unit 60 and the airplane model 46.

All functions or all function modules of the ground station functions 41 are connected by way of known data connections, with analyzing units or analyzing modules. Each function illustrated in FIG. 2 or each function block of FIG. 2 may be implemented as a hardware-type unit, as a software module or as both simultaneously. The data connections illustrated in FIG. 2 can therefore be implemented correspondingly by mere data transfer operations within software modules or by real electrical, optical or other data connections.

Figure 3:
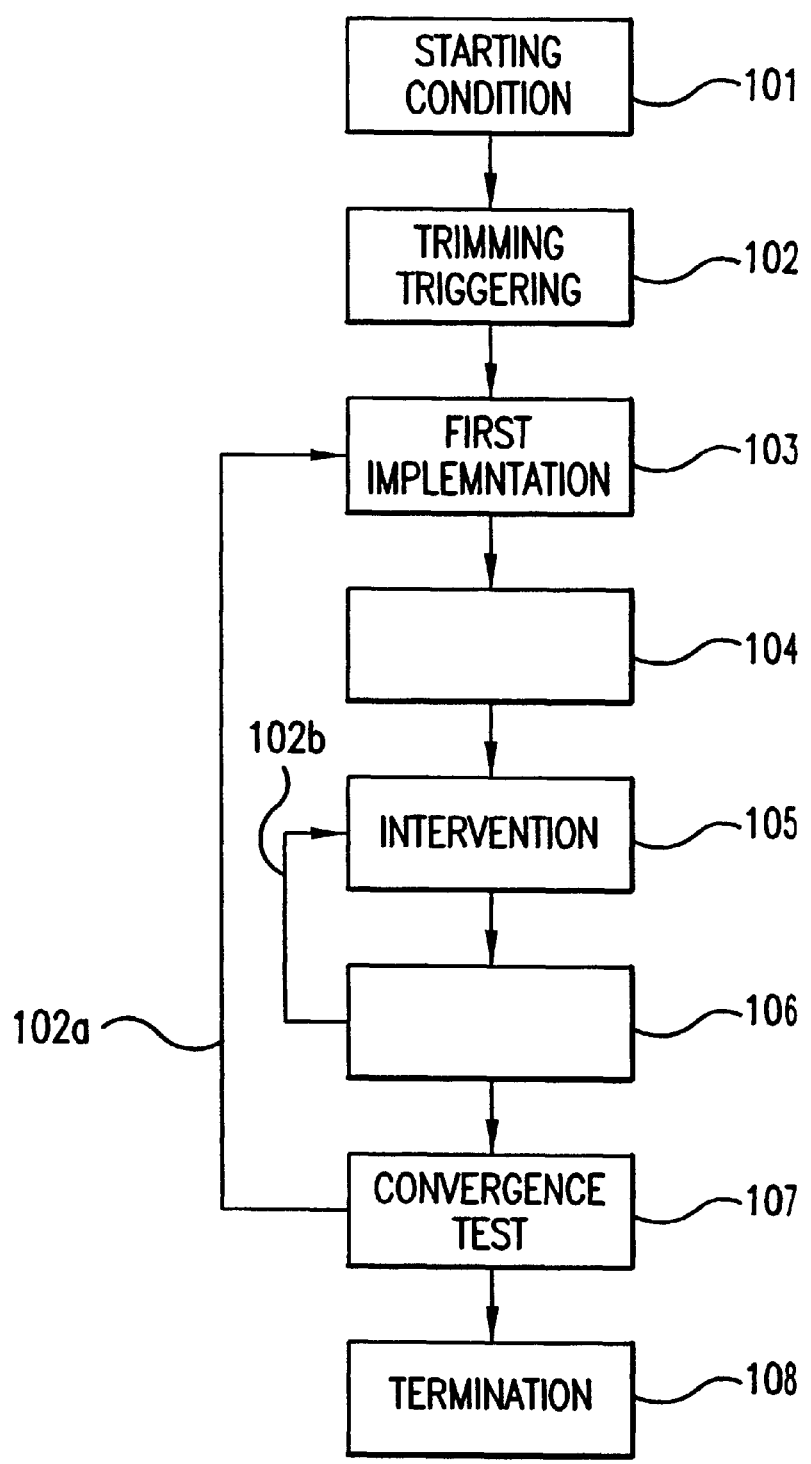
FIG. 3 is a flow chart of the simulation process according to the invention.

Referring now to FIG. 3, it is an object of the trimming process according to the invention to sufficiently coordinate the internal conditions of the autopilot 15, on one hand, and of the autopilot model 45, on the other hand; i.e., for example, to sufficiently coordinate the parameters of individual autopilot functions, such as integrators, limiting elements, amplification factors of the autopilot model 45 with those of the autopilot 15. After a flying maneuver, these differ at first. Most parameters, which are determined and processed within the autopilot 15, can normally not be tapped or determined during a flight. Thus, corresponding functions of the autopilot model 45 cannot simply be placed on a defined condition which coincides with the internal condition of the autopilot 15. On the contrary, the autopilot 15 and the autopilot model 45 are largely coordinated according to the invention by way of adapting operations or trimming operations.

In the starting condition 101, the real airplane 1 is flying and the corresponding airplane functions 11 are active. Simultaneously, the airplane simulation system 42 is virtually flying in a simulated environment and particularly in a simulated atmosphere. The desired data 28 of the pilot input system 17 in the flying airplane 1 are connected through. That is, these data are supplied directly to the autopilot model 45 in the form of the data 54 by way of the airplane telemetry device 25, the ground telemetry device 30. The autopilot 15 in the airplane 1 therefore operates on the basis of essentially the same desired input data 16, 28 as the autopilot model 45. In this case, it depends on the airplane type according to which values the pilot 1 commands the airplane 1; i.e., in the form of which values the desired input data 28 are sent to the autopilot 15 and are processed by the latter. The desired input data 28 may, for example, be rates of rotation. In the case of other airplanes, the desired input data 28 may be a combination of angles of rotatiion and angles of incidence or a combination of angles of rotation and the vertical acceleration.

Based on the different conditions of the autopilot 15 and of the autopilot model 45, in a general starting position, for example, the positions, the attitudes or generally the flight condition values of the real airplane 1 and of the airplane simulation 42 deviate from one another. In this situation, the different autopilot conditions are caused, for example, by the inaccuracies of the parameters of the airplane model 42 or by the differences in the real atmosphere and of the simulated atmospheric environment which is assigned to the airplane model 46. Particularly when consolidating input data, these differences can cause a condition in the autopilot model 45 which clearly differs from that in the autopilot 15. The different conditions in the autopilot 15, on one hand, and the autopilot model 45, on the other hand, lead to different flying conditions and particularly attitudes of the real airplane 1 and of the airplane model 46. The attitude is preferably determined in the form of so-called Eulerian angles or in the form of quaternions, which describe the attitude of an airplane by way of an airplane-fixed system of coordinates with respect to a space-fixed initial system of coordinates.

The trimming operation is normally carried out between two flying maneuvers and is triggered on the ground. The triggering of the trimming operation can take place, for example, by pressing an operating button. In this case, the trimming button of an input system (not shown) provided in the ground station 3 can be used. The triggering 102 of the trimming process is supplied to the control unit 60 which will then control the two loops described in the following, the second loop taking place within the first, thus being interlocked therewith.

In the first loop, the values determining the attitude, thus, the Eulerian angles or the quaternions, the momentary altitudes as well as their Mach numbers or their velocity amounts of the airplane model 46 are equated with the corresponding values of the real airplane 1. For this purpose, the attitude value, which is determined in the airplane 1 by the sensor system 13, is transmitted by the telemetry devices 25, 30 to the control unit 60 which will then supply the airplane model 46 via the line 61 with the corresponding data. In this step, however, the values for the flow angle of the airplane model 46, ($\alpha$) and ($\beta$), or values equivalent thereto, remain unchanged despite the intervention into the airplane model 46. The equating of the values determining the attitude of the momentary altitudes as well as their Mach numbers or velocity amounts takes place by an intervention at least in one part of the starting conditions of the differential motion equation of the airplane model 46. The rates of rotation contained therein are not changed, however, because they are related to the controlled variables. This rate of rotation is solved in each iteration step in order to determine, as a function of the input quantities or the autopilot control signals 45$a$, the flying condition of the airplane model 46 in the respective iteration step.

The autopilot 15 as well as the autopilot or the autopilot model 45 of the airplane simulation system 42 normally control alpha and beta or equivalent values, as, for example, the vertical acceleration instead of alpha. These values are therefore controlled variables. Furthermore, there are values which are connected with these values by way of the control loop, for example, according to the control concept of the airplane, the rate of rotations. As the result of the fact that these values, thus the controlled variables and also the values connected therewith remain in the airplane model, there is no intervention in the autopilot or the autopilot model 45. In this manner, there is no interference with the autopilot or the autopilot model 45. Otherwise, there would be the risk that, as the result of interventions into the flight control loop formed by the autopilot or the autopilot model 45 and the airplane model 46, the autopilot or the autopilot model 45 may be caused to carry out reactions which would make the trimming process significantly more difficult.

After the foregoing measure, the attitudes, the altitudes and the velocity amounts of the airplane model 46 have been converted to those of the real airplane 1 but the flow angles or values equivalent thereto differ in the case of the airplane model 46 and the real airplane 1, the airplane model 46 moves away from the real airplane 1 at least with respect to the flying condition values. During the trimming process and particularly during this removal process, the flow angles alpha, beta or values equivalent thereto, which, on one hand, were detected by the sensor system 13 and, on the other hand, were determined in the autopilot or the autopilot model 45, are supplied as a part of the data 47, 48 to the comparison device 49 which determines the differential values of the condition values and supplies these values to the control unit 60.

As soon as the differential values have exceeded a predetermined threshold value, in the second loop, the desired input data of the pilot input system 17, which are connected through to the autopilot or the autopilot model 45, are changed in the direction of a reduction of these differential values. This change takes place by way of the control unit 60 which acts by corresponding differential input values upon the desired input data connected through from the pilot input device 17 to the autopilot or the autopilot model 45 and supplies the acted-upon desired input data to the autopilot or the autopilot model 45. In this case, control signals or trimming values may be acted upon. The action upon, i.e., the supplying of the acted-upon signals to the autopilot or the autopilot model 45 preferably takes place by way of a predetermined number of iteration steps.

The action takes place, depending on its duration or intensity, until the airplane model changed by the latter in its attitude reduces the resulting deviation to a predetermined extent. In the specific application—as a function of the instability of the control system—, this extent may be very slight and also depends on the extent of the resulting deviation or of the required approach velocity between the airplane simulation system 42 and the reference system 1. Preferably the pilot commands 17 and 54 also remain fully in effect. In this case, the intervention 105 only has a correcting effect on the resulting flight path.

In other cases, however, the pilot commands 17, 54 may be temporarily switched off also in the airplane simulation system 42. After a defined time or a predetermined number of iteration steps or also after the exceeding of a threshold value for the differential values of condition quantities, a new supply takes place of the added-on desired input data 28 for the autopilot or the autopilot model 45 of the airplane simulation system 42. On which criterion the point in time of the new adding of differential input values is based depends on the application and should be selected with respect to a convergence of the trimming process that is as good as possible. This second loop with the measuring of the differential value of the condition quantities is repeated several times. The number of repetitions of the second loop within the first loop can be fixedly defined for the trimming process or may depend on how extensive the deviation of the condition quantities is after one or several iteration steps, that is, how well the condition values converge.

A convergence test takes place in a step 107. As long as this convergence criterion has not been met, the first loop is started again by changing the attitude values, the velocity amount and the altitude, in which case there is also at least on passing through the second loop in the first loop.

The trimming process is terminated after the end of the first loop 102a has been reached at least once, as soon as the convergence criterion has been met which is tested preferably at the end of each first loop 102a. This preferably consists of the fact that the differences of the flow values after a certain time duration or a number of iteration steps do not exceed a threshold value or threshold values corresponding to each comparison value.

The passing through the second loops 102b preferably takes place within the passing through the first loop 102a, in which case there is at least one passing through the second loops 102b. As an alternative, the passing through the second loop 102b can take place after the passing through a first loop 102a.

The trimming process is concluded when the end 108 is reached, and the flying maneuver to actually be tested can be carried out. The trimming process according to the invention ensures that the parameters of the autopilot or of the autopilot model 45 of the airplane simulation system 42 largely coincide with the parameters of the autopilot 15 of the airplane functions or of the reference system 11.

Steps 103 to 107 each preferably take place in an iteration or computing cycle. Depending on the configuration of the ground station functions 41, these steps can in each case also be carried out in several computing cycles. The steps 101 to 108 can be controlled by the control unit 60.

The endeavored adaptation may also already be achieved with the first implementation of step 103. Correspondingly, in the context of the application, the idea of repeating steps 102 and 104 also includes the idea that these steps 103 and 104 must not be repeated at all. As an alternative to the described sequence of the trimming process, the at least one second loop can also take place serially behind the at least one first loop. In particular, in this case, each loop can carry out a defined number of sequences.

In the trimming process according to the present invention, an autopilot model 45 of a ground station 3 must not be adapted to the autopilot 15 of a flying airplane. An autopilot model 45 of a ground station 3 may also be adapted to another autopilot model. This may be very important when verifying models. In each case, an autopilot model 45 is adapted with respect to a reference system 1 under time conditions and particularly in real time, preferably while carrying out tests or between the implementation of tests.

The process according to the invention is preferably carried out automatically. It can however, also be carried out manually, for example, in that each step 103, 104, 105, 106 is carried out individually by a manual operation. However, combinations of these alternatives are also conceivable.

The trimming process according to the invention can be used for airplanes in general, that is, for fixed-wing aircraft, gyroplanes as well as remotely piloted vehicles. In addition, the trimming process can also be used for generally automatically controlled systems to which a simulation system must be adapted without having to tap condition and/or controlled variables in the continuous process in order to determine internal parameters of the automatically controlled and simulated system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trimming process for adapting a first control loop of a controllable, automatically controlled reference system to a second control loop which simulates the reference system, comprising detecting flying condition values, including controlled variables, in the first and second control loops; returning the flying condition values, in each control loop for automatic control; acting upon the two control loops by the same desired input data, wherein a first process loop is provided for the adaptation of the returned flying condition values of the second flying control loop to the corresponding condition values of the reference system, in which process loop, for a predetermined time, the desired input data fed to the an autopilot are acted upon by differential input data values, which are acted upon in the direction of deviation of the flying condition values which occurs after conversion of the flying condition values in the first loop; in a further process loop, converting the unreturned flying condition values of the second control loop into the values of the corresponding flight condition values of the reference system; and passing the further process loop through several times, with the termination of the trimming process taking place by meeting a termination criterion.

2. The trimming process according to claim 1, wherein initiation of the further process loop occurs manually.

3. The trimming process according to claim 1, wherein the process loop for adaptation of the returned condition values takes place within the further process loop, and the repetition of the first process loop for adaptation of the returned condition values depends on meeting of an accuracy criterion.

4. The trimming process according to claim 1, wherein the reference system is a flying real airplane.

5. The trimming process according to claim 1, wherein the trimming process is carried out automatically.

* * * * *